United States Patent
Bell et al.

(10) Patent No.: US 10,417,288 B2
(45) Date of Patent: Sep. 17, 2019

(54) SEARCH OF WEB PAGE METADATA USING A FIND FUNCTION

(71) Applicant: International Business Machines Corporation, Armonk, NY (US)

(72) Inventors: Denise A. Bell, Austin, TX (US); Jana H. Jenkins, Raleigh, NC (US); Jeffrey A. Kusnitz, Campbell, CA (US); Sarah R. Plantenberg, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 14/670,576

(22) Filed: Mar. 27, 2015

(65) Prior Publication Data
US 2016/0283598 A1    Sep. 29, 2016

(51) Int. Cl.
*G06F 16/00*    (2019.01)
*G06F 16/951*    (2019.01)

(52) U.S. Cl.
CPC .................................. *G06F 16/951* (2019.01)

(58) Field of Classification Search
None
See application file for complete search history.

(56) References Cited

U.S. PATENT DOCUMENTS

| | | |
|---|---|---|
| 7,627,561 B2 | 12/2009 | Pell et al. |
| 8,145,660 B2 | 3/2012 | Marvit et al. |
| 8,204,950 B2 | 6/2012 | Alperin |
| 8,255,812 B1 | 8/2012 | Parparita et al. |
| 8,433,719 B1 * | 4/2013 | Choc ................. G06F 17/30389 707/705 |
| 9,043,320 B2 * | 5/2015 | Monga .............. G06F 17/30722 707/728 |
| 2012/0131053 A1 | 5/2012 | Rakshit |

(Continued)

FOREIGN PATENT DOCUMENTS

| | | |
|---|---|---|
| EP | 1929410 B1 | 5/2013 |
| WO | 2007033159 A1 | 3/2007 |

OTHER PUBLICATIONS

Agarwal et al., "Method and System for Extracting Temporal Information Corresponding to Artifacts in a Website", An IP.com Prior Art Database Technical Disclosure, IP.com No. 000200485, IP.com Electronic Publication: Oct. 15, 2010, Copyright: Yahoo! 2010.

(Continued)

*Primary Examiner* — Belix M Ortiz Ditren
(74) *Attorney, Agent, or Firm* — Alexander G. Jochym; Nicholas L. Cadmus

(57) ABSTRACT

In a method for identifying and highlighting terms on a web page, loading, by one or more processors, a web page. Receiving, by one or more processors, a search term. Searching, by one or more processors, the loaded web page for the search term. Determining, by one or more processors, that the search term does not exist on the loaded web page. Determining, by one or more processors, that metadata of the loaded web page contains the search term. Rendering, by one or more processors, the web page such that the search term exists on the rendered web page. Highlighting, by one or more processors, the search term on the rendered web page.

15 Claims, 5 Drawing Sheets

(56) References Cited

U.S. PATENT DOCUMENTS

2013/0151496 A1\* 6/2013 Jacobs .............. G06F 17/30864
 707/706
2015/0161135 A1\* 6/2015 Ciccolo ............. G06F 17/30867
 707/723

OTHER PUBLICATIONS

Costello, Sam, "Using Safari Find on Page", © 2014 About.com, <http://ipod.about.com/od/phonefeatures/qt/Using-Safari-Find-On-Page.htm>.
"Search for Text on a Web Page", Web page updated: Feb. 19, 2014, <http://www.nycourts.gov/howdoi/searching.shtml>.
Wyman, Alice et al., "How to search the contents of the current page for text or links", printed on Dec. 16, 2014, <https://support.mozilla.org/en-US/kb/search-contents-current-page-text-or-links>.

\* cited by examiner

SEARCH OF WEB PAGE METADATA USING A FIND FUNCTION

BACKGROUND OF THE INVENTION

The present invention relates generally to the field of web browsers, and more particularly to search functions within a web browser.

A web browser displays a web page on a computer monitor or mobile device. Although the web page is what is displayed by the web browser, the term "web page" also refers to a computer file, usually written in HyperText Markup Language (HTML) or a comparable markup language. On a network, a web browser can retrieve a web page from a remote web server. The web server may restrict access to only a private network such as a corporate intranet or it may provide access to the World Wide Web. Web browsers typically uses the Hypertext Transfer Protocol (HTTP) to request web pages.

HTML is a markup language for the creation of web pages and other information viewable in a web browser. The markup tells the web browser how to display a web page's words and images for a user. Each individual markup code is referred to as an element (but many people also refer to an individual markup code as a tag). Some elements come in pairs that indicate when some display effect is to begin and when the display effect is to end. JavaScript is used along with HTML, to add dynamic features to the web page.

Metadata (metacontent) is defined as data providing information about one or more aspects of other data. For example, a photograph (or "photo") may contain metadata that indicates the size of the photo, the model of camera used to take the photo, the date the photo was taken, and any other information that describes the photo. One form of metadata used on a web page is Extensible Markup Language (XML). XML is a markup language that defines a set of rules for encoding documents in a format which is both human-readable and machine-readable. HTML dictates how data is structured on a web page, whereas XML describes the data that is located on that page. Metadata can be stored internally in the file or structure as the data, commonly referred to as embedded metadata, or it can be stored externally in a separate file.

A twistie located on a web page or in a document is an icon that collapses or expands categorized lists or hides and reveals any other information or element. For example, a twistie for a particular category, e.g. American states, will usually have a list of items belonging to that category. In this example, a list of American states would be shown when the "American states" twistie is expanded. Likewise, the categories can have subcategories (e.g. cities). In this example, New York, an item listed under the "American states" category, has subcategories, one of which is "cities." When the "cities" twistie is expanded, a list of cities in New York (e.g. Albany) is displayed. When a twistie is collapsed, the list of items associated with it are hidden. When a twistie is expanded, the list of items is displayed.

SUMMARY

Aspects of the present invention disclose a method for identifying and highlighting terms on a web page. The method includes loading, by one or more processors, a web page. The method further includes receiving, by one or more processors, a search term. The method further includes searching, by one or more processors, the loaded web page for the search term. The method further includes determining, by one or more processors, that the search term does not exist on the loaded web page. The method further includes determining, by one or more processors, that metadata of the loaded web page contains the search term. The method further includes rendering, by one or more processors, the web page such that the search term exists on the rendered web page. The method further includes highlighting, by one or more processors, the search term on the rendered web page.

DETAILED DESCRIPTION

Embodiments of the present invention recognize that when a user searches for a term on a web page via a find function, a term that is hidden by a collapsed twistie will not be identified in the search result. Embodiments of the present invention allow a find function to search metadata of a web page in order to find and identify a term(s) that may be hidden beneath a collapsed twistie. Additionally, embodiments of the present invention search metadata located within subcategories of a collapsed twistie. Some embodiments of the present invention may include one, or more, of the following features, characteristics, and/or advantages: (i) using metadata to locate and identify a term(s) that is not loaded on web page, (ii) identifying the twistie that contains a sought term, and (iii) saving the user time by eliminating the need to expand some or all collapsed twisties on a web page to find a sought term(s).

The present invention will now be described in detail with reference to the Figures.

Figure 1:
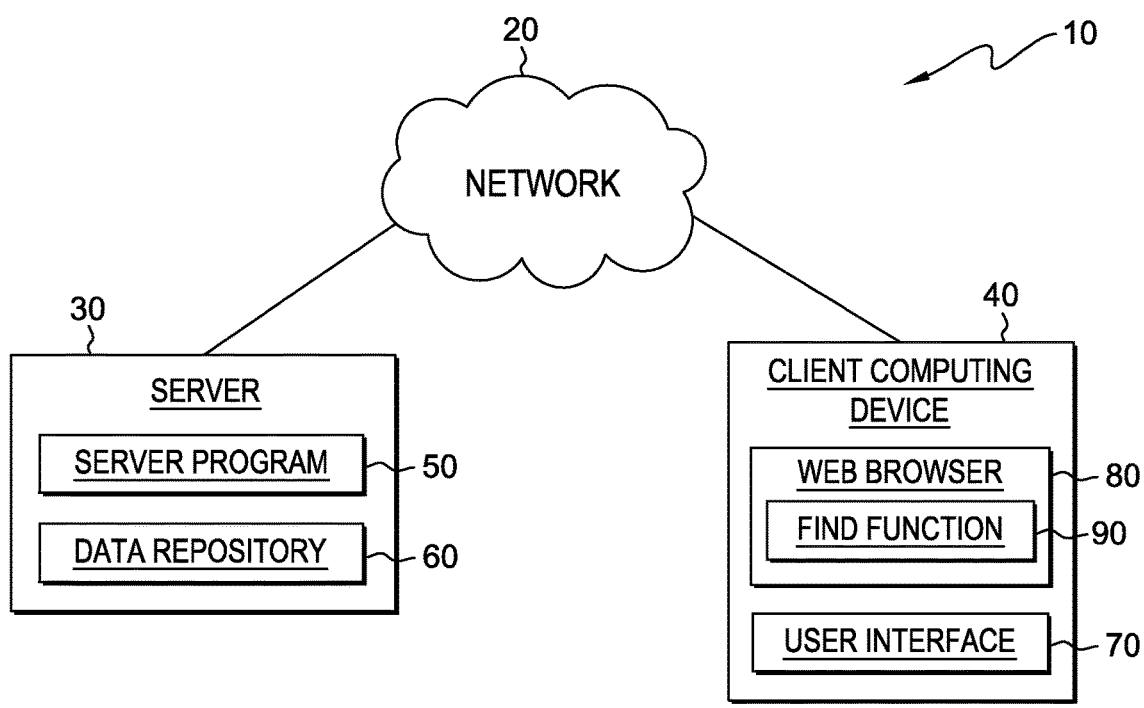
FIG. 1 depicts a functional block diagram illustrating a computing environment, in accordance with an embodiment of the present invention.

FIG. 1 depicts a diagram of computing environment 10 in accordance with one embodiment of the present invention. FIG. 1 provides an illustration of one embodiment and does not imply any limitations with regard to the environments in which different embodiments may be implemented.

In the depicted embodiment, computing environment 10 includes server 30 and client computing device 40 interconnected over network 20. Network 20 may be a local area network (LAN), a wide area network (WAN) such as the Internet, any combination thereof, or any combination of connections and protocols that will support communications between server 30 and client computing device 40 in accordance with embodiments of the invention. Network 20 may include wired, wireless, or fiber optic connections. Computing environment 10 may include additional computing devices, servers, or other devices not shown.

Server 30 may be a management server, a web server, or any other electronic device or computing environment capable of processing computer readable program instructions, and receiving and sending data. In some embodiments, server 30 may be a laptop computer, tablet computer, notebook computer, personal computer (PC), a desktop computer, or any programmable electronic device capable of communicating with client computing device 40 via network 20. In other embodiments, server 30 may represent a server computing environment utilizing multiple computers as a server system, such as in a cloud computing environment. In another embodiment, server 30 represents a computing environment utilizing clustered computers and components to act as a single pool of seamless resources. Server 30 contains server program 50 and data repository 60. Server 30 may include components as depicted and described in further detail with respect to FIG. 4.

Server program 50 manages requests for webpages received from other programs. In one embodiment, server program 50 receives a request for a web page from web browser 80. Server program 50 retrieves the requested web page data from data repository 60. Server program 50 sends the retrieved web page data to web browser 80. In some embodiments, web page data also includes metadata.

Data repository 60 may be written to, read from, and accessed by server program 50. In one embodiment, data repository 60 stores web page data relative to web pages hosted by server program 50. Web page data (elements) may include metadata, text, graphics, video, audio, hyperlinks, web scripts, etc. Web page data, like metadata, describes content on a web page. Metadata on a web page is descriptive data describing data on a web page. Web pages often include metadata in the form of meta tags. Descriptions and keywords in meta tags are commonly used to describe the web page's content. Most search engines use these data when adding pages to their search index. Meta elements are tags used in HTML and XHTML documents to provide structured metadata about a web page.

Data repository 60 may store both internal (embedded) metadata and external metadata that is detached from the web page data in a separate file. Metadata included in the web page data may include information about items associated with a twistie, and whether the twistie is expanded or collapsed. The metadata may also include the location of the twistie on the web page that will ultimately contain the items. A twistie can expand to display all items in a categorized list or other element and can collapse to hide all items associated with a categorized list or other element.

Client computing device 40 may be a desktop computer, laptop computer, tablet computer, notebook computer, personal digital assistant (PDA), or smart phone. In general, client computing device 40 may be any electronic device or computing system capable of executing computer readable program instructions, and communicating with server 30 over network 20. Client computing device 40 contains user interface 70, web browser 80, and find function 90. Client computing device 40 may include components, as depicted and described in further detail with respect to FIG. 4.

User interface (UI) 70 operates on client computing device 40 to visualize content, such as menus and icons, and to allow a user to interact with an application accessible to client computing device 40. UI 70 may display data received from web browser 80 and send input to web browser 80. UI 70 accepts input from users of client computing device 40. In example embodiments, a user (through input via UI 70) of client computing device 40 can utilize web browser 80 to communicate with server program 50, via network 20. In other embodiments, UI 70 may comprise one or more interfaces such as, an operating system interface and/or application interfaces.

Web browser 80 may be a generic web browser used to retrieve, present, and traverse information resources from the Internet. In some embodiments, web browser 80 may be a web browser designed for a mobile device. In other embodiments, web browser 80 may be a web browser designed for a traditional computing device, such as a desktop computer, PC, or laptop. In general, web browser 80 may be any application or software that enables a user at client computing device 40 to access a web page over network 20. In the depicted embodiment, web browser 80 resides on client computing device 40. In other embodiments, web browser 80, or similar web browsers, may reside on other computing devices capable of accessing a web page over network 20.

In one embodiment, a user using UI 70 inputs a Uniform Resource Locator (URL) in the address bar of web browser 80. A URL is a unique address for a web page and its associated files. Web browser 80 connects to server program 50 and sends an HTTP request for the desired web page. Web browser 80 receives web page data from server program 50 and the connection is closed. Web browser 80 parses through the web page data and looks for other page elements it needs to complete the web page. These usually include images, applets, etc. For each element needed, web browser 80 makes additional connections and HTTP requests to server program 50 for each element. When web browser 80 has finished loading all images, applets, etc., the page is completely loaded in the web browser.

Find function 90 operates to receive a search term(s) entered by a user via UI 70 and highlights the search term(s) if the term(s) is located on a loaded web page. In one embodiment, find function 90 is part of web browser 80. In another embodiment, find function 90 is a standalone program or part of some other program. In various embodiments, find function 90 also searches the metadata of a web page for a search term(s) entered by a user.

In one embodiment, find function 90 searches the text on a loaded web page for the search term(s). For example, find function 90 searches the loaded text on a loaded web page for the search term(s). As used herein, the loaded text is text that, at the time of the search, is able to be viewed by a user of web browser 80 viewing the loaded web page. The loaded text may be viewable directly on the user's screen or on portions of the web page that are accessible via scrolling using UI 70. It should be noted, however, that the loaded text does not include text that is located in a collapsed twistie. If the search term(s) is loaded on the page, find function 90 will highlight the search term(s). If the search term(s) is not found on the loaded web page, find function 90 searches the metadata of the loaded web page. If the search term(s) is located in the metadata, find function 90 expands a collapsed twistie and highlights the search term(s). In another embodiment, find function 90 simultaneously searches the loaded web page and the metadata of the loaded web page, highlighting search terms on the loaded webpage and search terms hidden beneath a collapsed twistie.

Figure 2:
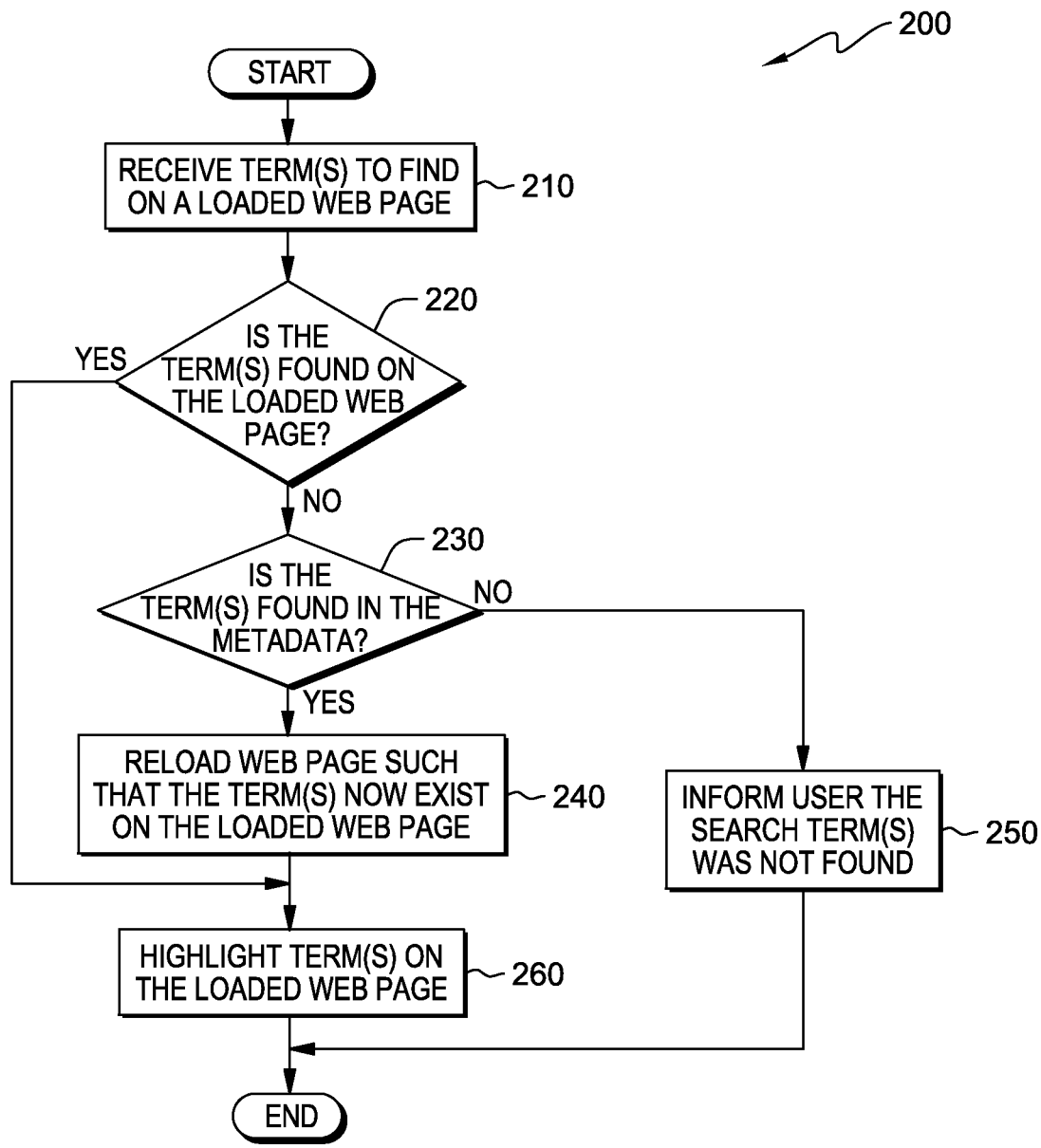
FIG. 2 depicts a flowchart of operational steps of a find function, a function of a web browser, for identifying and displaying a search term(s) on a web page, in accordance with an embodiment of the present invention.

FIG. 2 depicts a flowchart of operational steps 200 of find function 90, a function of web browser 80, executing within the computing environment of FIG. 1, in accordance with an embodiment of the present invention. Find function 90 operates to receive a search term(s) entered by a user via UI 70 and highlights the search term(s) if the term(s) is located on a loaded web page. If the search term(s) is not found on the loaded web page, find function 90 searches the metadata of the loaded web page. If the search term(s) is located in the metadata, find function 90 expands a collapsed twistie and highlights the search term(s).

In one embodiment, initially, a user of client computing device 40, through input via user interface (UI) 70, opens web browser 80. The user, through UI 70, inputs a Uniform Resource Locator (URL) in the address bar of web browser 80. Web browser 80 connects to server program 50 and sends a Hypertext Transfer Protocol (HTTP) request for the desired web page. Web browser 80 receives web page data from server program 50, and the connection is closed. Web browser 80 loads the web page using the web page data web browser 80 received from server program 50. Once the web page is loaded, the user activates find function 90 via UI 70. In one embodiment, find function 90 is activated by simultaneously pressing the "Ctrl" and "F" keys on a keyboard. In another embodiment, find function 90 is activated by touching an icon on the screen or displayed web browser on a touch screen device.

In step 210, find function 90 receives a search term(s) from the user, via UI 70, that the user wants find function 90 to locate and identify on the loaded web page. Find function 90 can receive and search for one or multiple terms. The word "term" covers any combination of letters, numbers, or other characters that can be inputted using UI 70.

In determination step 220, find function 90 determines if the search term(s) entered by the user exists on the loaded web page. In one embodiment, when find function 90 searches for multiple terms, it searches for the terms simultaneously. For example, if the user enters "New York" into find function 90, find function 90 will locate and identify "New York" on the web page if "New York" exists on the loaded web page.

If find function 90 determines the term(s) exists on the loaded web page, processing proceeds down the "Yes" branch to step 260. In step 260, find function 90 highlights the search term(s) on the loaded web page. For example, if a user enters "house" into find function 90, find function 90 searches the loaded web page and highlights all occurrences of the word "house." To view each occurrence of the word "house," a user can click "previous" or "next" to view the location of each occurrence of the word "house." Processing ends once the term(s) is highlighted. A term existing on a web page is still considered to be on the loaded web page even if it is not in the viewable area of the screen. For example, if an item exists on a web page but a user has to scroll down to view it, the item is still exists on the loaded web page.

If find function 90 determines the search term(s) does not exist on the loaded web page, processing proceeds down the "No" branch to step 230. In step 230, find function 90 determines if the search term(s) is located in the metadata of the loaded web page. Examples of elements in the metadata that find function 90 searches are meta tags, meta elements, and XML. If find function 90 determines the search term(s) is located in the metadata of the loaded web page, processing proceeds down the "Yes" branch to step 240.

In step 240, find function 90 loads the web page again such that the term(s) found in the metadata now exist on the loaded web page. In one embodiment, the term(s) may be hidden beneath a collapsed twistie on the loaded web page. If a search term(s) is hidden beneath a collapsed twistie, find function 90 expands the twistie and renders the web page again to display the search term(s). A user can enter one or more terms to be searched. "Loading" the web page in some embodiments does not mean completely reloading the web page's HTML. In some embodiments, (such as in the case of a twistie), the previously hidden content will be able to be displayed without actually reloading the page (e.g., rendering the web page again).

If find function 90 determines the term(s) is not located in the metadata, processing proceeds down the "No" branch to step 250, informing the user the term(s) is not located on the loaded web page. In one embodiment, find function 90 displays "no matches found" to inform the user the term(s) does not exist on the loaded web page or located in the metadata of the loaded web page. Processing ends once the user is informed the search term(s) was not located.

In step 260, find function 90 highlights the term(s) as described above.

Figure 3A:
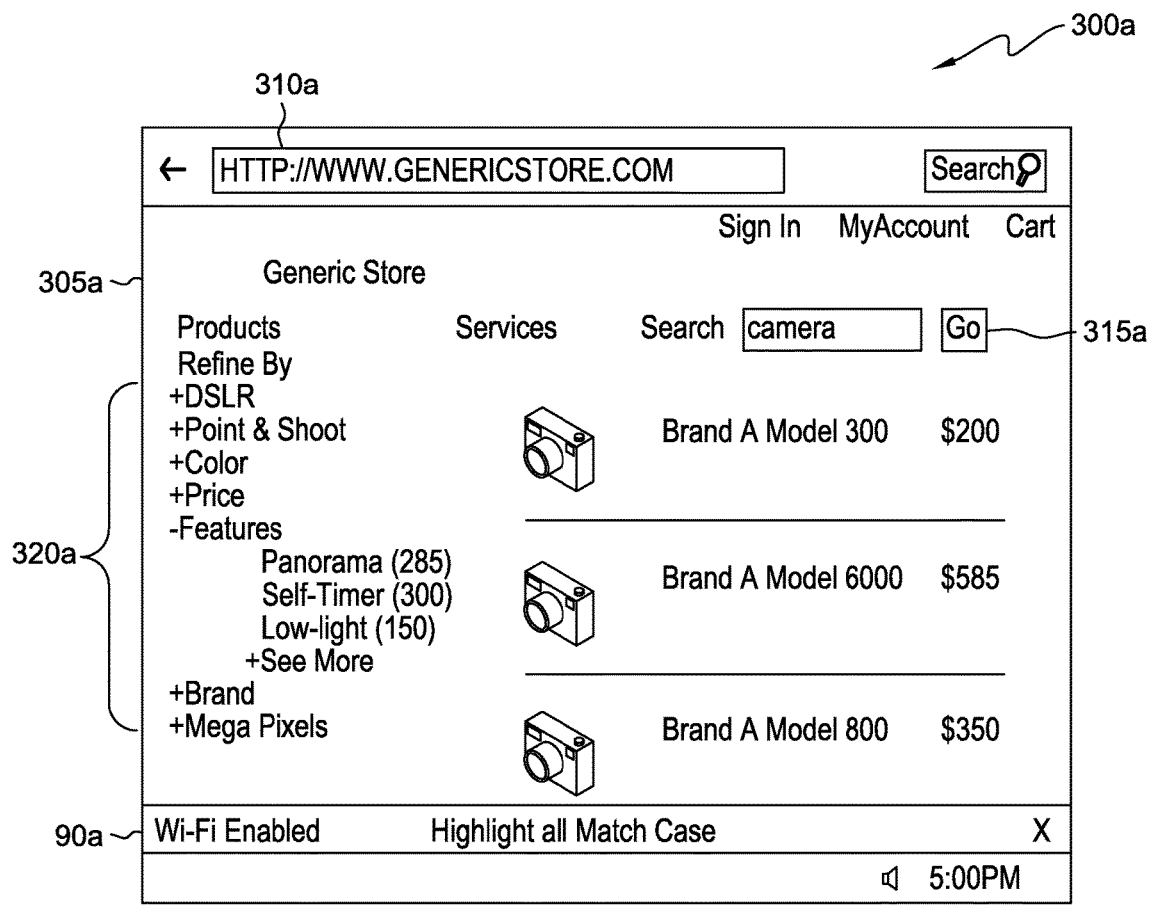
FIGS. 3A and 3B depict exemplary screenshot views generated using the find function of a web browser, in accordance with an embodiment of the present invention.
Figure 3B:
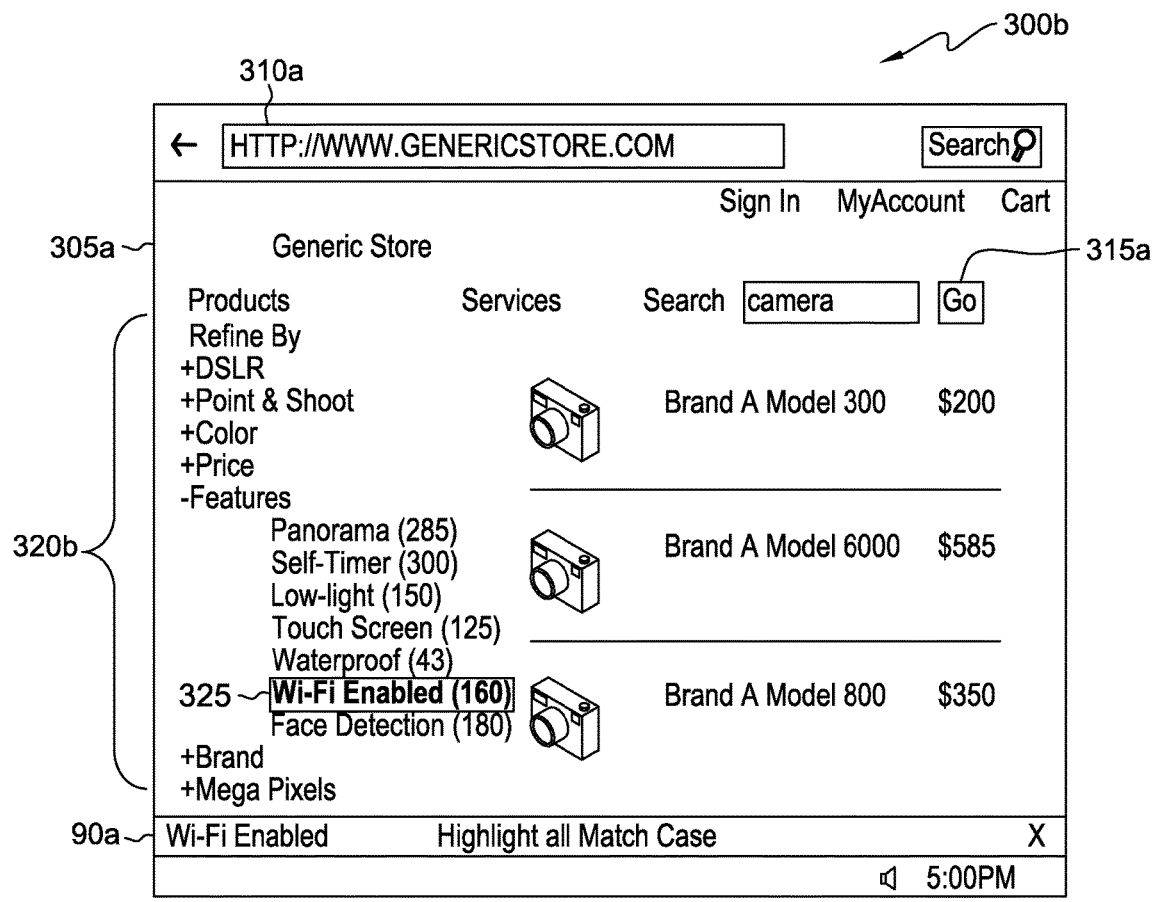

FIGS. 3A and 3B are illustrations of screenshots 300*a* and 300*b*, respectively. Screenshots 300*a* and 300*b* depict a portion of a loaded web page that is displayed on a screen and activated find function 90 in web browser 80. FIG. 3A is a depiction of the web page before find function 90 searches for the term(s). A user enters a Uniform Resource Identifier (URL) into address bar 310*a* to load web page 305*a*. In one embodiment, the user enters a term(s) into search box 315*a*, generating a list of results. In one example, a user enters "camera" into search box 315*a*. The search for "camera" generates a list of cameras. To view cameras containing a specific feature, the user can narrow down the search results by selecting a category. To narrow down the search result, the user selects a category from list 320*a*. To find a particular feature from list 320*a*, the user enters the term(s) into find function 90*a*. Find function 90*a* searches the metadata of web page 305*a* for the term(s). In this example, the user enters "Wi-Fi enabled" into find function 90*a*.

FIG. 3B is a depiction of web page 305*a* after find function 90*a* completes processing. Find function 90*a* highlights the term(s) from list 320*b*. In this example, find function 90*a* expands list 320*b* to display and highlight "Wi-Fi enabled."

Figure 4:
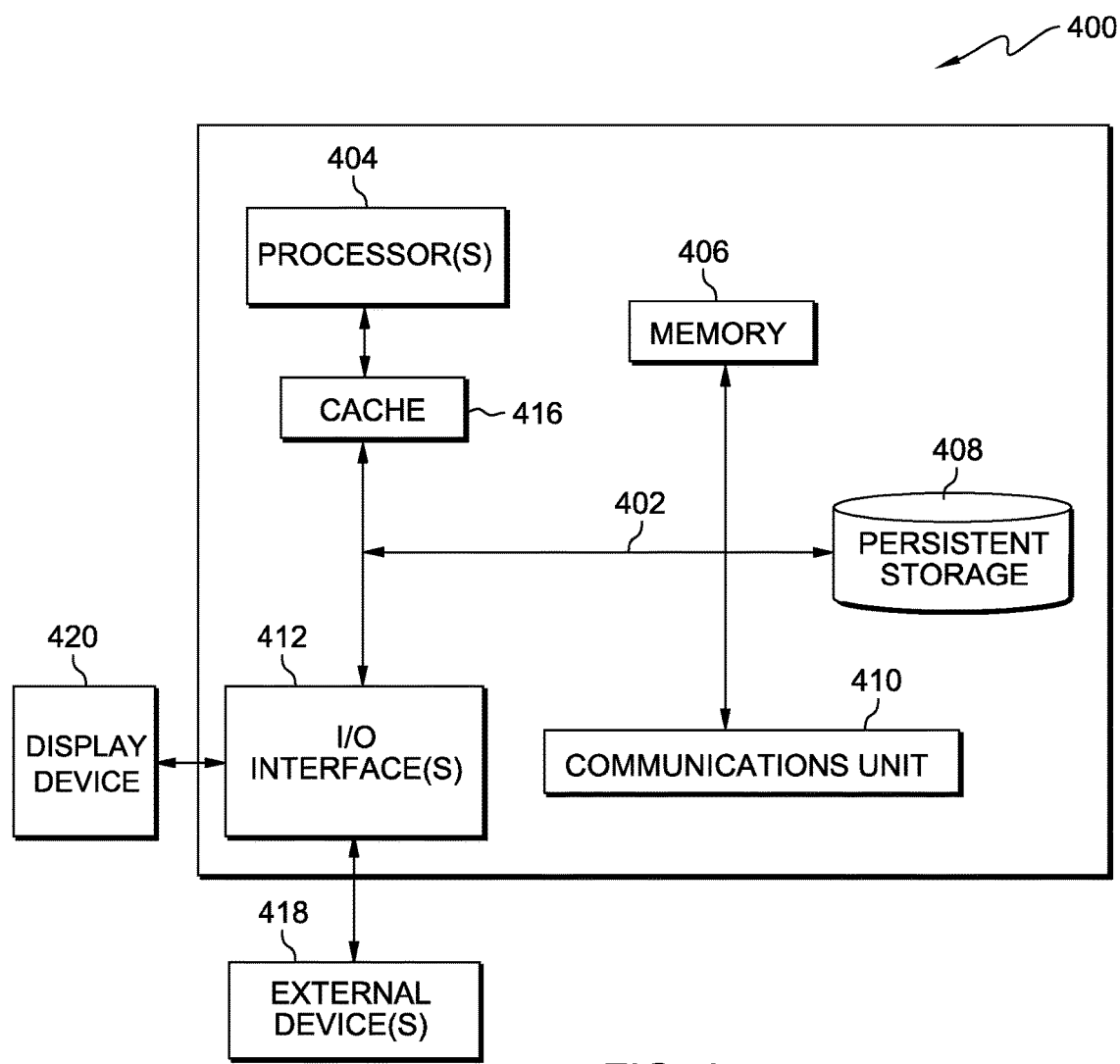
FIG. 4 is a block diagram of components of the server and client computing device of FIG. 1, in accordance with an embodiment of the present invention.

FIG. 4 depicts a block diagram of components of computer 400 which is representative of server 30 and client computing device 40 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 30 and client computing device 40 may each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Server program 50 and data repository 60 may each be stored in persistent storage 408 of server 30 and in memory 406 of server 30 for execution by one or more of the respective computer processors 404 via cache 416. User Interface (UI) 70, web browser 80, and find function 90 may each be stored in persistent storage 408 of client computing device 40 and in memory 406 of client computing device 40 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Server program 50 and data repository 60 may be downloaded to persistent storage 408 of server 30 through communications unit 410 of server 30. UI 70, web browser 80, and find function 90 may be downloaded to persistent storage 408 of client computing device 40 through communications unit 410 of client computing device 40.

I/O interface(s) 412 allows for input and output of data with other devices that may be connected to server 30 or client computing device 40. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., server program 50 and data repository 60, can be stored on such portable computer readable storage media and can be loaded onto persistent storage 408 of server 30 via I/O interface(s) 412 of server 30. I/O interface(s) 412 also connect to a display 420. Software and data used to practice embodiments of the present invention, e.g., UI 70, web browser 80, and find function 90 can be stored on such portable computer readable storage media and can be loaded onto persistent storage 408 of client computing device 40 via I/O interface(s) 412 of client computing device 40. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying and highlighting terms on a web page, the method comprising:
    loading, by one or more processors, a web page;
    receiving, by one or more processors, a search term;
    determining, by one or more processors, a web element of the loaded web page, wherein the web element contains hidden content, and wherein the hidden content is not rendered on the webpage;
    determining, by one or more processors, that metadata of the hidden content of the web element contains the search term, wherein the determination is made while the hidden content is not rendered on the webpage;
    rendering, by one or more processors, the web page such that the hidden content of the web element exists on the rendered web page, wherein the hidden content is displayed on the webpage after the rendering; and
    highlighting, by one or more processors, the search term on the rendered web page.

2. The method of claim 1, wherein the web element is a collapsed twistie element.

3. The method of claim 2, wherein the step of determining, by one or more processors, that metadata of the hidden content of the web element contains the search term comprises:
    searching, in the metadata, the terms hidden in the collapsed twistie element for the search term; and
    determining that a term of the terms hidden in the collapsed twistie element matches the search term.

4. The method of claim 3, wherein the step of rendering, by one or more processors, the web page such that the hidden content of the web element exists on the rendered web page comprises:
    expanding the collapsed twistie element such that the term of the terms hidden in the collapsed twistie element that matches the search term exists on the rendered web page.

5. The method of claim 1, wherein the step of highlighting, by one or more processors, the search term on the rendered web page comprises:
    scrolling the rendered web page such that a portion of the web page that contains the search term existing on the rendered web page is displayed.

6. A computer program product for identifying and highlighting terms on a web page, the computer program product comprising:
    one or more computer readable storage media, program instructions stored on the one or more computer readable storage media, the program instructions comprising:
    program instructions to load a web page;
    program instructions to receive search term;
    program instructions to determine a web element of the loaded web page, wherein the web element contains hidden content, and wherein the hidden content is not rendered on the webpage;
    program instructions to determine that metadata of the hidden content of the web element contains the search term, wherein the determination is made while the hidden content is not rendered on the webpage;
    program instructions to render the web page such that the hidden content of the web element exists on the rendered web page, wherein the hidden content is displayed on the webpage after the rendering; and program instructions to highlight the search term on the rendered web page.

7. The computer program product of claim 6, wherein the web element is a collapsed twistie element.

8. The computer program product of claim 7, wherein the program instructions to determine that metadata of the hidden content of the web element contains the search term comprise program instructions to:
   search, in the metadata, the terms hidden in the collapsed twistie element for the search term; and
   determine that a term of the terms hidden in the collapsed twistie element matches the search term.

9. The computer program product of claim 8, wherein the program instructions to render the web page such that the hidden content of the web element t exists on the rendered web page comprise program instruction to:
   expand the collapsed twistie element such that the term of the terms hidden in the collapsed twistie element that matches the search term exists on the rendered web page.

10. The computer program product of claim 6, wherein the program instructions to highlight the search term on the rendered web page comprise program instructions to:
    scroll the rendered web page such that a portion of the web page that contains the search term existing on the rendered web page is displayed.

11. A computer system for identifying and highlighting terms on a web page, the computer system comprising:
    one or more computer processors;
    one or more computer readable storage media; and
    program instructions stored on the computer readable storage media for execution by at least one of the one or more processors, the program instructions comprising:
    program instructions to load a web page;
    program instructions to receive search term;
    program instructions to determine a web element of the loaded web page, wherein the web element contains hidden content, and wherein the hidden content is not rendered on the webpage;
    program instructions to determine that metadata of the hidden content of the web element contains the search term, wherein the determination is made while the hidden content is not rendered on the webpage;
    program instructions to render the web page such that the hidden content of the web element exists on the rendered web page, wherein the hidden content is displayed on the webpage after the rendering; and
    program instructions to highlight the search term on the rendered web page.

12. The computer system of claim 11, wherein the web element is a collapsed twistie element.

13. The computer system of claim 12, wherein the program instructions to determine that metadata of the hidden content of the web element contains the search term comprise program instructions to:
    search, in the metadata, the terms hidden in the collapsed twistie element for the search term; and
    determine that a term of the terms hidden in the collapsed twistie element matches the search term.

14. The computer system of claim 13, wherein the program instructions to render the web page such that the hidden content of the web element exists on the rendered web page comprise program instruction to:
    expand the collapsed twistie element such that the term of the terms hidden in the collapsed twistie element that matches the search term exists on the rendered web page.

15. The computer system of claim 11, wherein the program instructions to highlight the search term on the rendered web page comprise program instructions to:
    scroll the rendered web page such that a portion of the web page that contains the search term existing on the rendered web page is displayed.

* * * * *